HEAD MOTION SENSING SYSTEM
Filed Oct. 20, 1961
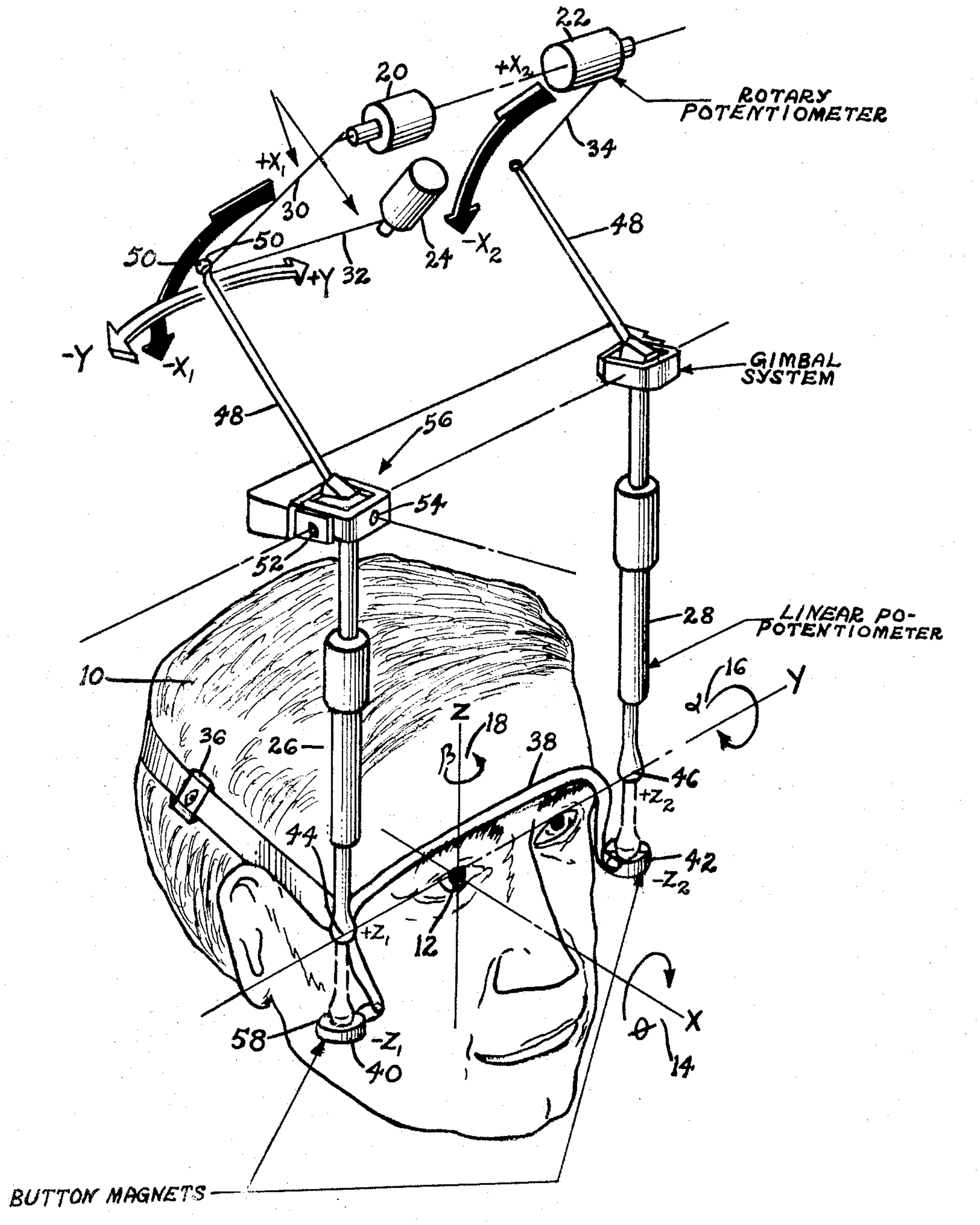
INVENTORS
HERBERT A. WAGNER
STEWART C. BROWN
BY
Laurence S. Epstein
ATTORNEY United States Patent Office 3,161,846
Patented Dec. 15, 1964

3,161,846

HEAD MOTION SENSING SYSTEM

Herbert A. Wagner, 4625 Lindley Ave., Tarzana, Calif., and Stewart C. Brown, Chatsworth, Calif.; said Brown assignor to the United States of America as represented by the Secretary of the Navy Filed Oct. 20, 1961, Ser. No. 155,520
(Filed under Rule 47(a) and 35 U.S.C. 116)
5 Claims. (Cl. 338—67)

The present invention relates to an improved apparatus for imparting head motion information through a servo system. The overall servo system is described in copending application, Serial No. 127,757, filed April 18, 1961. The instant device relates to a novel head set for operating a plurality of motion sensing potentiometers which in turn control servo systems for maintaining a periscope of the optical system in alignment with the eye of an observer regardless of the motions of the observer's head. Apparatus heretofore utilized for imparting head motions or for studying or recording ocular performance of eye movements has been bulky, expensive and complicated in operations.

One of the objects of the instant invention is to provide an improved head set for sensing motions of the head.

A further object of the instant invention is to provide an improved apparatus for producing electrical signals which are proportional to head motions.

Another object of the instant invention is to provide an improved head motion sensing apparatus which is light in weight and inexpensive to construct.

Further objects and many of the attendant advantages of this invention will be readily appreciated as the same becomes better understood by reference to the following detailed description when considered in connection with the accompanying drawing wherein the sole figure depicts a detailed view of the head set servo.

The right eye 12 of the subject 10 is used as the center of the coordinate system axes X, Y and Z. Rotations about these axes are marked 14, 16 and 18, theta, alpha and beta respectively.

Rotation about the Z axis, angle beta, 18, causes a (−X) rotation on potentiometer 22 and an X rotation on potentiometer 20. The algebraic sum of these signals is fed to the servo system and causes the proper motion of the periscope.

Thus, the two ball ends of the potentiometers 26 and 28 define a line through the eye, and all head motions from this point in space are sensed and an optical system is caused to move to maintain a fixed distance between the eye and the eyepiece. An adjustable headband 36 is attached to a movable bar 38 which supports button magnets 40 and 42. The bar 38 is bent to describe an arc about the eye as a center position. The position of the magnets is adjustable on the bar 38. A fixture consisting of two balls, 44 and 46, which are located at a proper distance apart for the zero of the servo system and a cross hair mounted perpendicular to a line through the centers of the two balls is placed in the concave seats of the magnets 40 and 42. The head set and magnet angles are adjusted until the subject's right eye is in line with the cross hairs, at point 12. The subject then adjusts the head band until rotation of the fixture comprising potentiometers 26 and 28, ball ends 44 and 46, in the forward vertical plane produces no apparent shift of the cross hair. The head set is now adjusted to define a line through the center of the user's eye. Attachment of the head set to the head motion sensing system causes an input to a servo system which is derived from the user's head motion.

Both linear potentiometers 26 and 28 are identical in operation and therefore only the operation of a linear potentiometer 26 will be described. There are three rotary potentiometers respectively 20, 22, and 24 and two linear potentiometers respectively 26 and 28. Each of the six possible head motions will be described and the corresponding motion of the head sensing elements tabulated. Up and down motion +Z results in the same vertical sign signal being applied to the two linear potentiometers 26 and 28. Fore and aft motions +X result in a pivot of the rod 48 about the center of the gimbal system parallel to the Y axis, causing the cords 30, 32, and 34 to be pulled in the directions marked +X, imparting the same signal to the rotary potentiometers 20 and 22. These cords are spring loaded to return to zero position. Left return movement +Y causes a rotation of both rods 48 about the gimbal axes parallel to the X axis. This imparts a rotary motion to potentiometer 24, which is spring loaded to return to zero position. Thus, each translation reults in a different signal to the various potentiometers, and any combination of translations results in more than one signal being sent to the servo system.

Rotation of the head about the X axis (angle theta 14), causes potentiometer 26 to move up and potentiometer 28 to move down. The algebraic sum of potentiometers 26 and 28 is fed to the servo system and causes the periscope motion as required.

Rotation about the Y axis, angle alpha, 16, results in a combination of X and Z motions which are sensed by the same potentiometers and the motion of the periscope is a combined X and Z translation.

The upper portion of linear potentiometer 26 has extending therefrom at an angle a motion sensing arm 48. Ball end 44, within a depression in magnet 40, permits rotational movement of the bracket 38 with respect to linear potentiometer 26. The ball end 50 of the extending arm 48 of potentiometer 26, follows the motion of ball end 44. The potentiometer 26 pivots about point 52, for movement in the X direction. The potentiometer 26 pivots about point 54 for movement in the Y direction. Thus pivot points 52 and 54 of the supporting structure 56 forms a gimbal system. Movement in the Z direction, is sensed by movement of ball end 44 within swivel 58. Cord 32 is wrapped around ball end 50, actuating potentiometers 20 and 24 for sensing cords 30 and 32, for sensing motion in the plus X and Y directions.

Obviously many modifications and variations of the present invention are possible in the light of the above teachings. It is therefore to be understood that within the scope of the appended claims the invention may be practiced otherwise than as specifically described.

What is claimed is:

1. A head motion headset apparatus, comprising means adapted to be attached to the brow of a human subject and carried by the head for movement therewith, means coupled to said brow means for sensing the motions thereof, said head motion sensing means being operatively connected to signal generating means for generation of servo control signals.

2. The combination of claim 1 wherein said means adapted to be attached to said brow comprises a bracket shaped to fit a human brow, strap means fastened to alternate sides of said bracket and being adjustable about the back of the wearer's head.

3. A head motion headset apparatus comprising means adapted to be attached to the brow of a human subject and carried by the head for movement therewith, means coupled to said brow device for sensing the motions thereof, said head motion sensing means being operatively connected to signal generating means for generation of servo control signals, said means adapted to be attached to said brow comprising a bracket shaped to fit a human brow, and strap means fastened to alternate sides of said bracket, said strap means being adjustable about the back of the wearer's head, and button magnets fixedly connected to each end of said brow bracket.

4. The combination of claim 3 wherein said head motion sensing means and signal generating means comprise potentiometers.

5. The structure of claim 4 wherein said potentiometers comprise two linear potentiometers and three rotational spring load potentiometers.

References Cited in the file of this patent

UNITED STATES PATENTS

| | | |
|---|---|---|
| 2,470,968 | Aske | May 24, 1949 |
| 2,929,258 | Mackway | Mar. 22, 1960 |